United States Patent [19]

Betsch et al.

[11] Patent Number: 4,614,903
[45] Date of Patent: Sep. 30, 1986

[54] WINDSHIELD WIPER SPEED CONTROL ARRANGEMENT

[75] Inventors: Helmut Betsch, Sachsenheim; Walter Bierent, Ludwigsburg; Günther Gille, Sersheim; Horst Goertler, Sachsenheim; Hans Prohaska; Horst Rachner, both of Bietigheim-Bissingen, all of Fed. Rep. of Germany

[73] Assignee: ITT Industries, Inc., New York, N.Y.

[21] Appl. No.: 651,226

[22] Filed: Sep. 14, 1984

[30] Foreign Application Priority Data

Sep. 14, 1983 [DE] Fed. Rep. of Germany ....... 3333119

[51] Int. Cl.$^4$ .............................................. H02P 3/06
[52] U.S. Cl. .................................... 318/443; 318/444; 318/DIG. 2; 15/250 C
[58] Field of Search ................. 318/443, 444, DIG. 2; 15/250 C, 250.16, 250.17; 307/10 R

[56] References Cited

U.S. PATENT DOCUMENTS

| 3,689,817 | 9/1972 | Elliott | 318/444 X |
| 3,774,091 | 11/1973 | Kearns | 318/443 X |
| 4,309,646 | 1/1982 | Liedtke et al. | 318/443 |
| 4,329,631 | 5/1982 | Betsch et al. | 318/466 |
| 4,336,482 | 6/1982 | Goertler et al. | 318/443 |

FOREIGN PATENT DOCUMENTS

| 53-155381 | 7/1978 | Japan | 318/443 |
| 54-124445 | 9/1979 | Japan | 318/443 |
| 2052099 | 1/1981 | United Kingdom | 15/250.17 |

Primary Examiner—William M. Shoop, Jr.
Assistant Examiner—Bentsu Ro
Attorney, Agent, or Firm—Donald J. Lenkszus

[57] ABSTRACT

In a circuit arrangement for a reversible electric motor for directly driving a windshield wiper the motor is operated at reduced rotational speed in predetermined angular ranges to ensure smooth starting and stopping in the reversing positions and an accurate parking position.

24 Claims, 11 Drawing Figures

WINDSHIELD WIPER SPEED CONTROL ARRANGEMENT

BACKGROUND OF THE INVENTION

This invention pertains to a circuit arrangement for a reversible electric motor, in general and to a circuit arrangement in particular for a windshield wiper system.

Windshield wiper systems, in which the pendulum motion of the windshield wiper is directly derived from the rotary motion of the armature of an electric motor, whose polarity is reversed in the reversing positions and thus its direction of rotation is changed, have the advantage of being small and using less mechanical component parts. Moreover the wiping angle can be varied over wide ranges and thus be adapted to different windshield sizes. However the motional behavior of a windshield wiper driven by a reversible motor differs from the motional behavior of a windshield wiper of conventional systems as follows:

Because of the kinematic crank gear the wiper speed of conventional wiper systems is not constant. In contrast, the wiper speed of a wiper system comprising a reversible motor is constant, provided that the frictional conditions on the pane to be cleaned and the operating voltage are constant. Therefore, in a reversible motor driven system the wiper enters the reversing position at a relatively high speed, is then braked relatively abruptly and is subsequently started from the reversing position at a high rotational speed. Thus the motion of the wiper is not free from jerks. Some drivers dislike such motion. Moreover in conventional wiper systems the wiping angle is mechanically determined by the design of the crank gear. In contrast, in reversible motor wiper systems the wiping angle depends on various factors, because due to the kinetic energy the wiper is not immediately stopped when the motor is switched off, but moves on across a larger or smaller after-running angle. Thus the parking position limits of a reversible motor wiper system cannot be defined as narrowly as in conventional systems.

One circuit arrangement directed to solving this problem has been described U.S. Pat. No. 4,329,631. In that circuit arrangement the rotational speed of the motor is determined and, in dependence thereon, the motor is stopped at differing angular positions. The wiping angle can be held constant within narrow limits by a circuit arrangement of this kind, so that the parking position of the wiper can also be defined more exactly.

SUMMARY OF THE INVENTION

The present invention provides an improved reversible motor a windshield wiper system in which the motor directly drives the wiper, i.e., without pendulum-type gearing, so that the motional behavior of the wiper corresponds to that of conventional wiper systems having a pendulum-type gearing.

In accordance with the invention the motor in energised via a switching stage which reduces the rotational speed of the motor in predetermined angular ranges.

In one embodiment of the invention, the motor is operated at reduced rotational speed only in a predetermined angular range before reaching the parking position and is operated at the predetermined nominal speed during the remaining wiper operation. Thus, the parking position of the windshield wiper is exactly defined because, when the rotational speed is reduced before the motor is switched off, the after-running angle of the windscreen wiper will not exceed a given size, even if the window pane is still wet and the friction is therefore low.

In windshield wiper systems with a relatively big windshield wiper it is especially necessary that the after-running angle in the reversing positions during wiper operation is also reduced. Therefore in accordance with the invention the motor is operated at reduced rotational speed not only before reaching the parking position, but also before each reversing position. Thus the course of motion is adapted to that of conventional windshield wiper systems, because the windshield wiper is no longer braked abruptly in the reversing positions, but slows down gradually with reduced rotational speed.

In an especially preferred embodiment of the invention the motor is, additionally operated at reduced rotational speed in a defined angular range after leaving the parking position or the reversing position to ensure a smooth jerk free start from these reversing positions.

The angular ranges in which the rotational speed of the motor is reduced can be predetermined by, for example, position switches actuated by the motor in particular angular positions, to control the switching stage for the reduction of the rotational speed. Even more advantageous are embodiments in which the size of this angular range is variable in dependence on certain measured values, such as the supply voltage of the motor and/or the rotational speed of the motor or the wiper speed previously measured. In contrast to the solution of U.S. Pat. No. 4,329,631 in which the time of switching off is varied, in the present invention the range in which the rotational speed is reduced is varied. An even more accurate wiping angle is achieved when the switching-off time is additionally varied.

Experiments have shown that in general it is sufficient to reduce the rotational speed of the motor in these angular ranges to an exactly defined value. However, better results are obtained when the rotational speed of the motor is variable, by steps or continuously, in these angular ranges. This can be realised when the motor is controlled through a switching stage through which the supply voltage for the motor or the pulse width of the voltage pulses conducted to the motor are variable. However the amount of circuitry for a solution of this kind is considerable. An embodiment is therefore preferred, in which the switching stage connects differing series resistors into the motor circuit.

These series resistors can be connected into the circuit between the reversing switch and one motor terminal or between the reversing switch and the voltage source. These two alternatives are of equal value, if the reversing switch, through which the motor changes its polarity to reverse its direction of rotation, has two bridging contacts which are simultaneously actuated. However, the two alternatives result in differing courses of motion, if according to an especially preferred development the reversing switch has two change-over bridging contacts connected to the motor and actuable by a change-over relay each, of which change-over bridging contacts each co-operates with two stationary contacts connected to the voltage source, and if these change-over relays in the reversing positions are energised independently of each other and one after the other via limit switches actuated by the motor. In an embodiment of this kind a brake circuit for the motor is closed before the latter is connected with the supply voltage of opposite polarity in the reversing positions. This means that the series resistor of the first-mentioned alternative can also affect this brake circuit and thus the braking of the motor is retarded. However the series resistor of the other alternative is not connected with the brake circuit so that an abrupt braking of the motor via a short-circuit is still ensured. Which one of the two alternatives is preferred depends on whether more value is attributed to a gradual running out of the motor or to a more constant parking position.

As in conventional wiper systems the motor is not stopped immediately after switching off of an operating switch, but only when it enters the parking position. In embodiments of this kind in which the rotational speed of the motor is only reduced in an angular range before the parking position it will be provided according to an advantageous development of the invention that the motor is, as a matter of principle, only stopped at the reduced rotational speed.

In embodiments of a kind in which the angular range or, according to U.S. Pat. No. 4,329,631 the time of switching-off is varied in dependence on certain measured values, the actual parking position is determined after switching-off of the motor and compared with a desired position. The angular difference between the parking position and a desired position is stored and, in dependence on this stored value, the motor is switched off appropriately earlier in the following cycle or changed over to a reduced rotational speed. This storing of a correction value can either be carried out only upon switching on the system for the first time or in every cycle. Thus in the first-mentioned alternative the manual input of a correction value according to U.S. Pat. No. 4,329,631 is no longer necessary. In the second alternative the actual operating conditions are continuously taken into consideration so that the wiping angle can be very accurately regulated.

BRIEF DESCRIPTION OF THE DRAWING

The invention and further advantageous developments are described below in detail by way of the embodiments shown in the accompanying drawing, in which.

DETAILED DESCRIPTION

Figure 1:
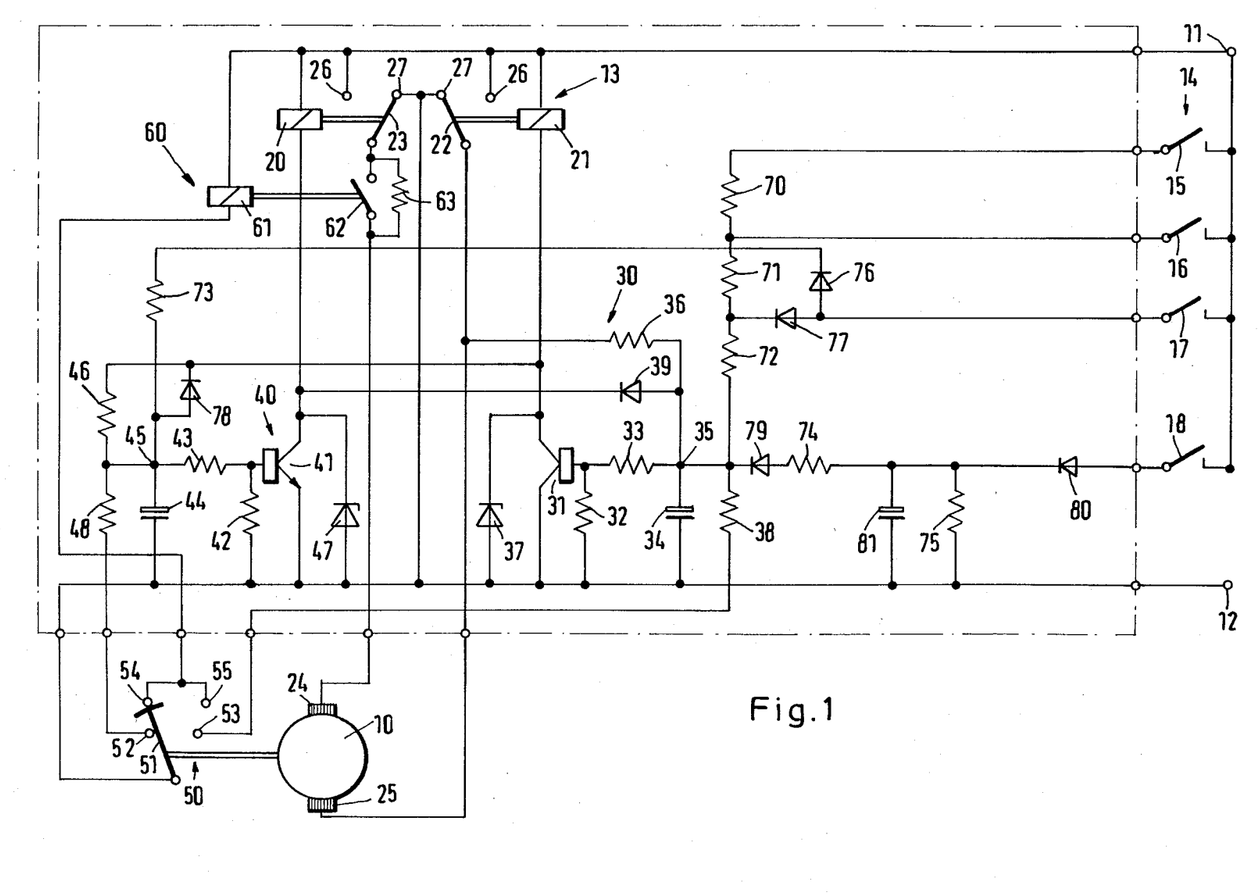
FIG. 1 is a circuit arrangement of a first embodiment.

A motor 10 is supplied from a voltage source not shown in detail having positive terminal 11 and negative terminal 12 through a reversing switch 13. An operating switch 14 having several single switches 15, 16, 17 and 18 is provided for switching on and off the motor 10. Reversing switch 13 comprises two switching relays 20 and 21, of which each actuates a change-over bridging contact 22 or 23. The supply voltage is conducted to the motor terminals 24 and 25 via these change over bridging contacts 22 and 23. Each of the change-over bridging contacts 22 and 23 co-operates with two stationary contacts 26 or 27 which are connected with the positive pole 11 or the negative pole 12 of the voltage source.

Each change-over relay 20 or 21 is controlled via an associated timing element 30 or 40. Each timing element has a transistor 31 or 41 for controlling the associated change-over relay. Between base and emitter of each of these transistors is inserted a resistor 32 or 42. A further resistor 33 or 43 is provided to limit the base current. In each case the base voltage is controlled by the voltage of a capacitor 34 or 44. The common circuit point between the capacitor and the current-limiting resistor is designated 35 or 45 and is the input of the respective timing element 30 or 40. Resistor 36 ensures that a complete wiping cycle is also carried out when there is a short-time voltage pulse at the input 35. Resistor 46 or the diode 39 ensure that in each case only one of the two transistors 31 or 41 is conductive.

A Zener diode 37 or 47 for the protection of the associated transistor is part of each timing element. Switching signals of a switch 50 actuated by the motor are conducted to the timing elements 30 or 40 via low-impedance resistors 38 or 48. Switch 50 has a movable bridging contact 51 which is connected with the negative pole 12 of the voltage source and, in the reversing positions of the motor 10, co-operates with the stationary contacts 52 and 53 to act as limit switches. Switch 50 has two stationary contacts 54 and 55 which, together with the bridging contact 51, form position switches which are controlled in specific angular positions before the reversing position.

A switching stage 60 reduces the rotational speed of the motor. Switching stage 60 incorporates a controllable switching element, i.e. relay 61 which has one coil terminal connected with the positive pole of the voltage source and has its other coil terminal connection controlled via the stationary contacts 54 or 55 of the position switch. Relay 61 actuates a contact 62 connected in parallel to a series resistor 63 which is part of the switching stage 60. Series resistor 63 is inserted in the motor circuit between the reversing switch 13 and the motor 10.

The operating switch 14 controls a resistance network comprising the resistors 70 to 75. The diodes 76 to 79 serve for decoupling. Furthermore a capacitor 81 is part of this network. Upon actuation of one of the single switches 15 to 18 positive potential is conducted to the input 35 of the timing element 30 and the motor 10 is therefore switched on as described below:

In the initial condition shown a brake circuit for the motor 10 is closed via the series resistor 63, because the two change-over bridging contacts 22 and 23 rest upon the stationary contacts 27 connected with the negative pole 12 of the voltage source. Capacitors 34 and 44 are discharged and thus the transistors 31 and 41 are blocked. If switch 16 is actuated, positive potential is conducted to the input 35 of the timing element 30 via the resistors 71 and 72. Thus the capacitor 34 is recharged and, after a delay time of less than one second, the transistor 31 is connected through.

Thus relay 21 is energised and the change-over bridging contact 22 is changed over into its operating position. The motor terminal 25 is connected with positive potential and the motor 10 rotates in a given direction of rotation. Relay 61 is also energised, because the bridging contact 51 rests upon the stationary contact 54. The switching path in parallel to the series resistor 63 is thereby interrupted, so that this series resistor 63 is inserted in the motor circuit. Thus the motor initially rotates at reduced rotational speed.

Transistor 41 continues to be blocked for the time being, because a potential close to ground potential is conducted to the input 45 of the timing element 40 via the feedback resistor 46 and the collector-emitter junction of the transistor 31.

The movable bridging contact 51 is displaced in clockwise direction by the movement of the motor. After a predetermined angular range this bridging contact 51 no longer rests on the stationary contact 54, so that the relay 61 is de-energised and the contact 62 bridges the series resistor 63. Now the motor 10 is driven at nominal speed.

Before the other reversing position is reached the bridging contact 51 moves to the stationary contact 55 energizing relay 61 so that the series resistor 63 is again inserted into the motor circuit. Thus the series resistor 63 is again inserted in the motor circuit at a predetermined angular range before the reversing position and the rotational speed of the motor is reduced.

Eventually bridging contact 51 rests upon the stationary contact 53, so that ground potential is conducted to the input 35 of the timing element 30 via the resistor 38. Capacitor 34 discharges rapidly via this resistor 38, so that the transistor 31 is blocked. The change-over bridging contact 22 again occupies the position shown and a brake circuit is closed via the series resistor 63, because the relay 61 continues to be energised. The motor 10 thus slows down gradually.

Because transistor 31 is blocked, positive potential is conducted to input 45 of the other timing element 40 via relay 21 and feedback resistor 46, so that the capacitor 44 is recharged. Thus transistor 41 becomes conductive after a short delay time and the relay 20 is energised. Now the other motor terminal 24 is connected with positive potential via series resistor 63, so that the motor 10 rotates in the opposite direction.

As soon as motor 10 has run through a given angular range and the bridging contacts 51 no longer rests upon the stationary contact 55, the relay 61 is de-energised, the series resistor 63 is short-circuited and the motor is once again driven at its increased nominal speed. Thus the motor starts smoothly from the reversing position with reduced rotational speed and without jerks.

As soon as bridging contact 51 rests again upon stationary contact 54, the series resistor 63 is again inserted in the motor circuit. Thus the motor enters its parking position with reduced rotational speed. As soon as bridging contact 51 rests upon stationary contact 52, capacitor 44 is rapidly discharged via resistor 48 and transistor 41 is blocked. The initial condition is reached again. A brake circuit for the motor 10 is closed via series resistor 63, so that the motor slows down gradually to its parking position. During this course of motion the transistor 31 is blocked, because a potential close to ground potential is conducted to the input 35 of the timing element via the diode 39. If in the meantime the operating switch is switched off, no positive voltage for recharging the capacitor 34 is available on the input 35 of the timing element and the system is switched off. If, however, the single switch 16 continues to be switched on the capacitor 34 is recharged anew and the process described above is repeated.

It is pointed out that certain specific aspects of this circuit arrangement have been described in detail in U.S. Pat. No. 4,336,482 and the German specification OS No. 3,044,011.

In particular the reversing switch is realised by two change-over relays which may be actuated independently of each other and energised one after the other with a delay in time. Thus it is ensured that the motor is switched off at first and stopped via a braking circuit before a supply voltage of reverse polarity is connected. Thereby the load on the relay contacts is diminished and, moreover, the course of motion is affected advantageously.

The delay time of the timing element 30 is substantially affected by the value of the charging resistance of the capacitor 34. When the single switch 15 is actuated the resistors 70, 71 and 72 are effective as charging resistors so that the delay time is relatively long. When the single switch 16 is actuated, only the resistors 71 and 72 are effective as charging resistors, so that the delay time is shorter. Upon actuation of the single switch 17 only the resistor 72 is effective, so that the delay time is reduced further. Upon actuation of this single switch 17 the resistor 73 is connected in parallel with the feedback resistor 46 via the diode 76. This feedback resistor serves as a charging resistor for the capacitor 44. Thus the capacitor 44 is charged more rapidly through a smaller charging resistor. Intermittent operation, fast wiper speed, slow wiper speed can be selectively switched on by actuating the single switches 15, 16 and 17. The various resistance values are selected such that, during intermittent operation, the delay time of the timing element 30 is much longer than the delay time of the timing element 40. In contrast thereto the delay times of the two timing elements are almost of the same duration, when the single switches 16 and 17 are actuated, however in one case both are longer than in the other case. Although the motor 10 is operated with constant rotational speed the wiper speed is greater upon actuation of the single switch 17 than upon actuation of the single switch 16, because the delay times are then shorter.

A so-called wiper-washer operation is switched on through the single switch 18. Capacitor 81 is charged via the diode 80 and the charging voltage of this capacitor is connected to the input 35 of the timing element 30 via the resistor 74 and the diode 79. The resistor 74 thereby affects the delay time of the timing element 30. After single switch 18 is switched off the motor 10 carries out several further wiping cycles until the capacitor 81 has discharged. Normally a washer pump not shown in detail is energised via the single switch 18, so that the window pane is washed and wiped. When the single switch 18 is switched off an after-wiping process of about three wiping cycles is carried out.

Figure 2:
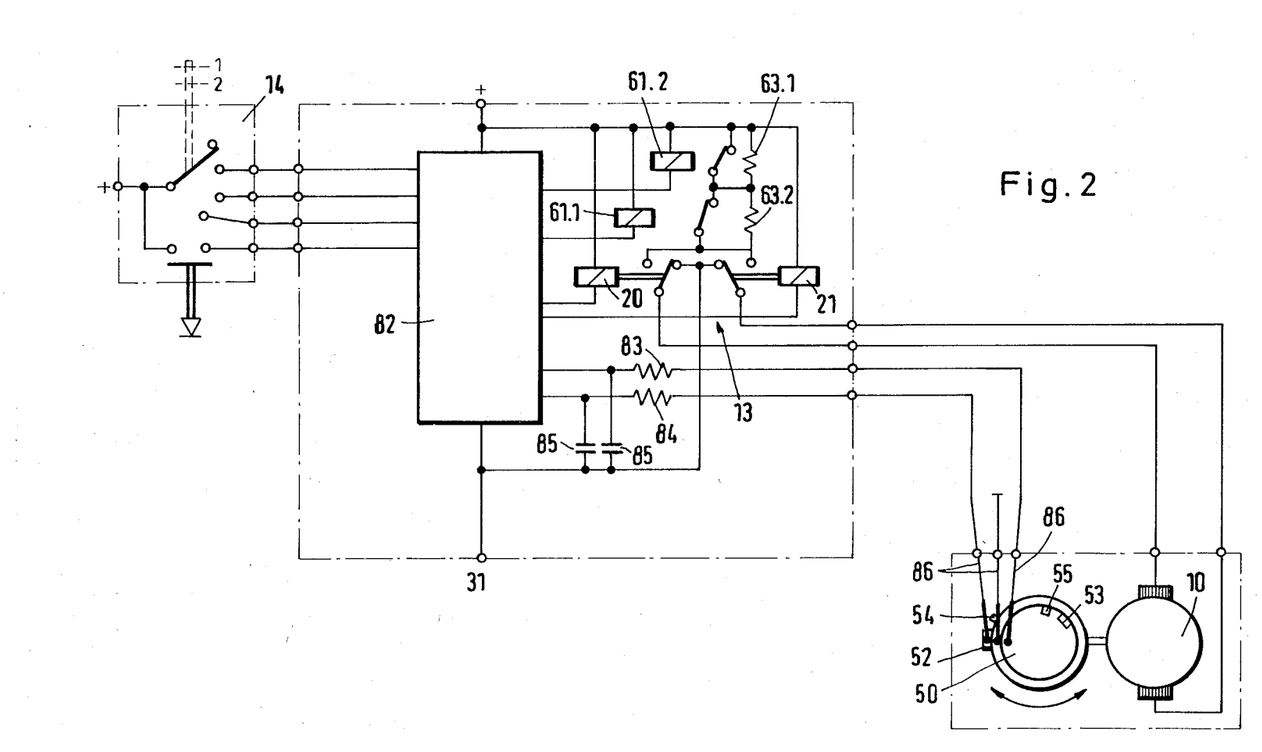
FIG. 2 is a block diagram of a second embodiment.

FIG. 2 shows a block diagram of a circuit modification. The switching signals of the operating switch 14 are conducted to a control circuit 82. Control circuit 82 can be realised with components similar to FIG. 1, however a microprocessor will be preferably used. Moreover, switching signals are conducted to the control circuit 82 via the series resistors 83 and 84. The switching signals are released by the stationary contacts 52 to 55. The capacitors 85 serve for disturbance elimination of these switching signals. The control circuit 82 controls in a suitable manner the relays 20 and 21 and two switching stages comprising the relays 61.1 and 61.2, whose contacts are connected in parallel to two series resistors 63.1 and 63.2. In contrast to the embodiment of FIG. 1 these series resistors are inserted between the voltage source and the reversing switch 13. In addition the embodiment according to FIG. 2 differs from that of FIG. 1 in that switch 50 is realised by a switching disk having a contact path upon which rest several sliding springs. As soon as these sliding springs 86 jump on the corresponding stationary contacts 52 to 55 of the contact path connected to earth, short-time set and reset signals are released which are evaluated by the control circuit 82 for energising the single relays.

Figure 3:
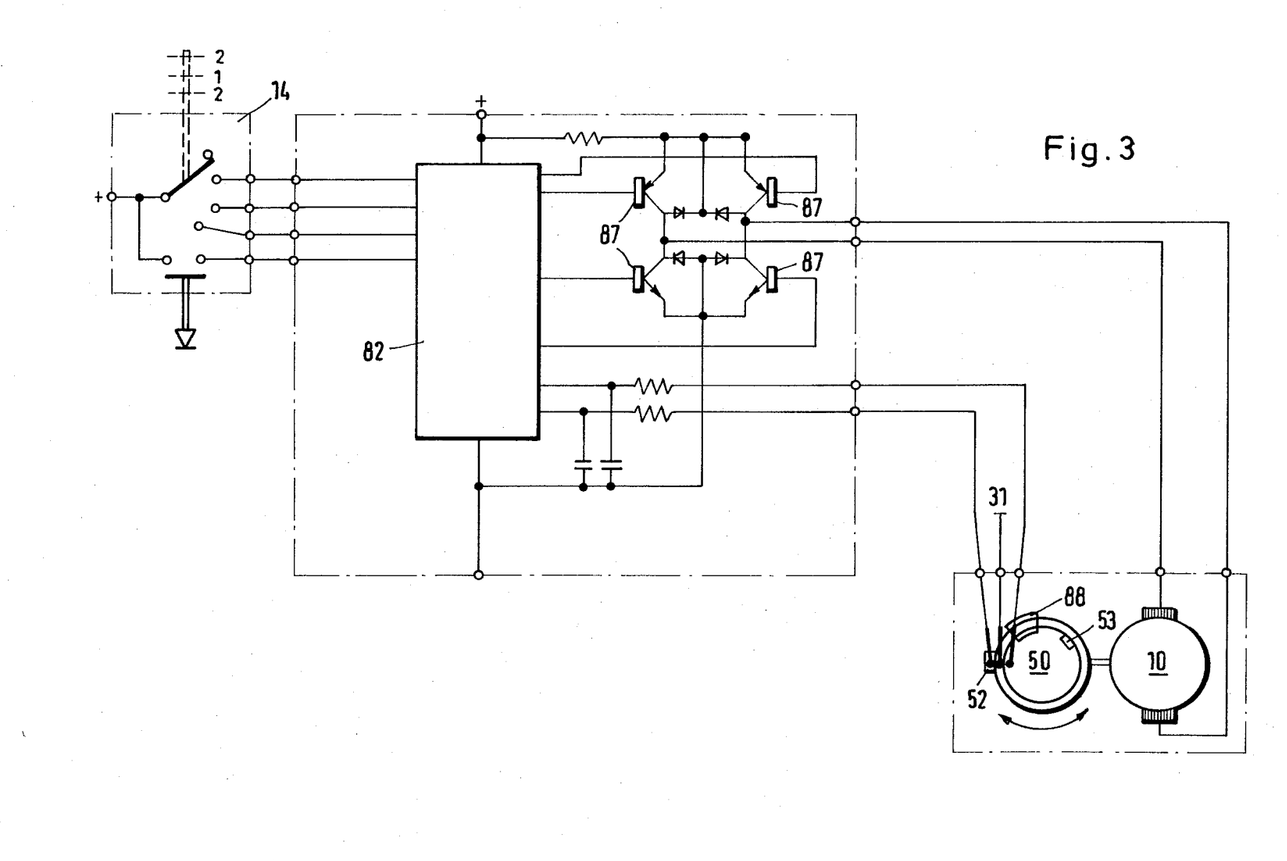
FIG. 3 is a block diagram of a third embodiment.

FIG. 3 shows a third embodiment in which the motor 10 is not energised via a relay-operated reversing switch, but via a transistor switch. The transistors 87 are controlled in a known manner in fixed-cycle operation, whereby the pulse width is variable, so that a continuous control of the rotational speed is possible. The principle and the layout of a circuit arrangement for the control of pulse widths is known and series-produced modules for controlling the various transistors 87 are available, so that further explanations are not to be necessary. The switch 50 differs from the switch according to the FIGS. 1 and 2 in that a contact segment 88 is provided in a central angular range and thus the stationary contacts 54 and 55 are effectively simultaneously controlled.

Figure 4:
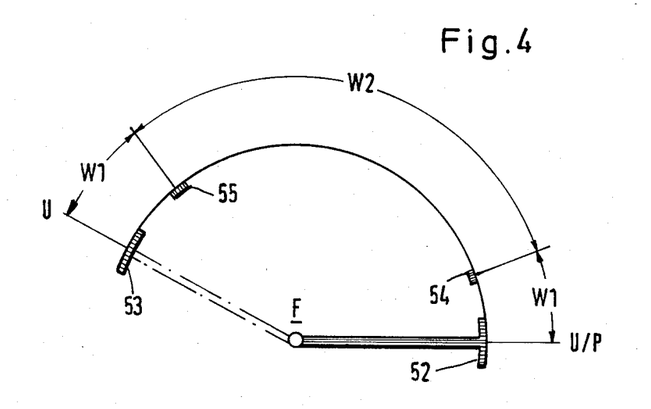
FIGS. 4–10 are schematic representations of a wiping area showing different courses of motion.

Differing courses of motion which can be realised with circuit arrangements of this kind are illustrated below by way of FIGS. 4 to 11. There is shown the wiping area F between the two reversing positions U, of which one is the parking position P and across which wiping area the wiper moves. Furthermore the position of the stationary contacts 52 to 55 can be seen in FIG. 4 and several angular areas W1 and W2 are separated from each other. FIG. 4 shows an embodiment which may be realised by means of the circuit arrangement according to FIG. 1. The wiper runs at reduced rotational speed from the parking position P. In the angular range W1 the rotational speed of the motor is reduced. In the angular range W2 the motor runs with its nominal speed and in the angular range W1 before reaching the reversing position the rotational speed is reduced anew. As soon as the stationary contact 53 becomes effective a brake circuit is closed via the series resistor, so that the motor is gradually stopped. The motor also starts with reduced rotational speed from the reversing position U. In predetermined angular ranges before the wiper reaches the reversing position, the motor is changed over to a reduced rotational speed and is also operated at reduced rotational speed when it starts from the reversing positions into this angular range W1. Thus a gradual starting and slowing down of the motor is achieved and, due to the reduction of the rotational speed before it reaches the parking position, a more accurate parking position of the wiper driven by the motor. However a disadvantage of this embodiment is that, when the wiper installation is tight, the motor although applied to voltage via the series resistor can stop. This deficiency could, however be eliminated, for example in the embodiment according to FIG. 1, by inserting a timing element into the control circuit between the stationary contact 54, 55 and the relay 61, which timing element switches off the relay 61 after a predetermined time. Thus in an embodiment of this kind the angular range in which the rotational speed is reduced would be only indirectly dependent on the signals released by the position switches actuated through the motor.

Embodiments can also be conceived in which the stationary contact 55 is eliminated, so that the rotational speed is only reduced before the parking position is reached. This is reasonable, because in most cases it is only desired that the parking position is accurately adhered to in which the wiper is parked in parallel to the rim of the window pane. A logic interconnection circuit could be provided here in such a way that this stationary contact becomes only effective when the operating switch is switched off. Thus during normal wiper operation the motor runs at nominal speed. Only upon switching off of the wiper system is the rotational speed reduced in the angular range W1 before the parking position is reached.

The two stationary contact 54 and 55 may be eliminated and relay 61 may then be controlled as in the embodiment according to FIG. 1 directly through 52 and 53 by inserting a timing element. In this case the motor slows down gradually and starts at reduced rotational speed until the timing element connects the relay 61 again.

Figure 5:
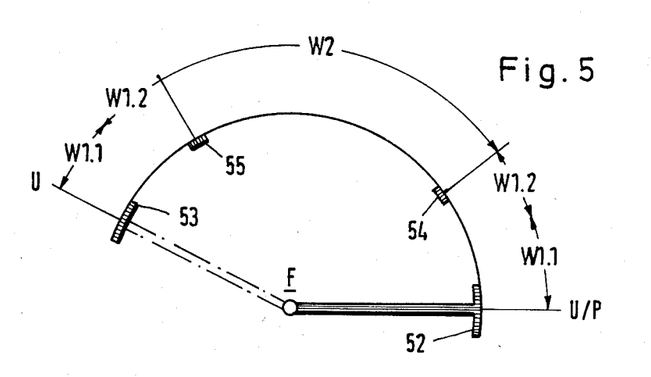

A different course of motion is achieved in the embodiment according to FIG. 2 in connection with FIG. 5. In this case both series resistors 63.1 and 63.2 are initially inserted in the motor circuit in the angular range W 1.1 while in the angular range W 1.2 one of these series resistors is bridged. Thus the two series resistors are switched off one after the other, when the motor starts. In the angular range W2 the motor is driven at nominal speed, both series resistors are bridged. Before the reversing position is reached the two series resistors are then connected into the circuit one after the other in the angular range W1, so that the rotational speed is reduced by steps. However in contrast to the embodiment of FIG. 1 the motor is thereafter abruptly braked by short circuit, so that a particularly accurate reversing position or parking position is realised. The connection or disconnection of the various series resistors could be directly controlled through position switches, if further stationary contacts are provided, however the control circuit 82 may release the series resistors one after the other with a delay in time in dependence on, for example, the supply voltage of the motor or of the measured rotational speed of the motor as well. In this manner a particularly smooth starting or running out of the motor can be achieved, especially if more than two series resistors are provided. Of course only one series resistor could also be used in an embodiment according to FIG. 2.

Figure 6:
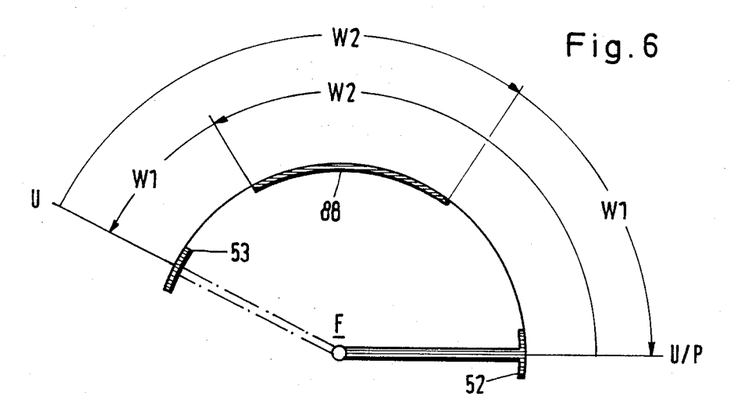

FIG. 6 is intended to make clear an alternative embodiment in which a series resistor, which according to FIG. 2 is inserted in the motor circuit between the voltage source and the reversing switch, is only connected in the angular range W1 to reduce the rotational speed before the motor slows down. Thus the relay 61 is energised, when a corresponding sliding spring no longer rests upon the contact segment 88. In the parking position and in the reversing position the relay 61 is de-energised again, so that the motor starts at nominal speed.

Figure 7:
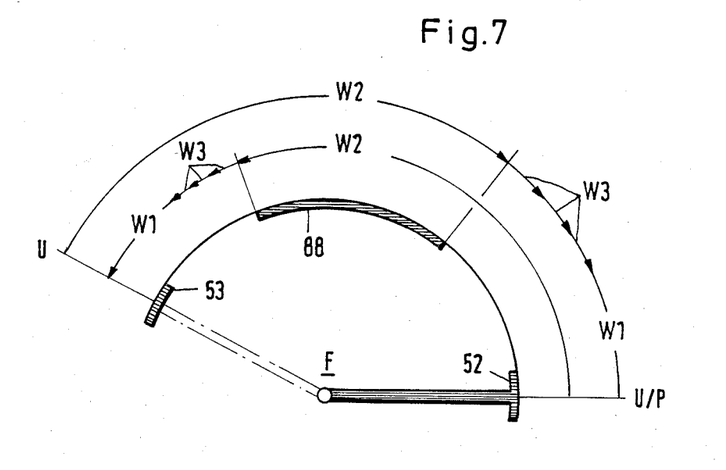

It has been indicated in the embodiment according to FIG. 7, that the angular range W1 is variable. In the angular range W2 the actual wiping speed is measured and in dependence thereon a time circuit is connected which determines a given after-running angle W3 across which the wiper has to move, when the sliding spring leaves the angular range W2, before the rotational speed is reduced. When the wiper speed is high this angular range W3 is small. When the wiper speed is slow, however, this angular range W3 is large, so that a constant reversing position is achieved independently of the frictional conditions on the window pane. The delay time of this timing element or this angular range W3 can furthermore be dependent on the operating voltage in such a way that the angular range is small at high operating voltage, but large at low operating voltage.

Figure 8:
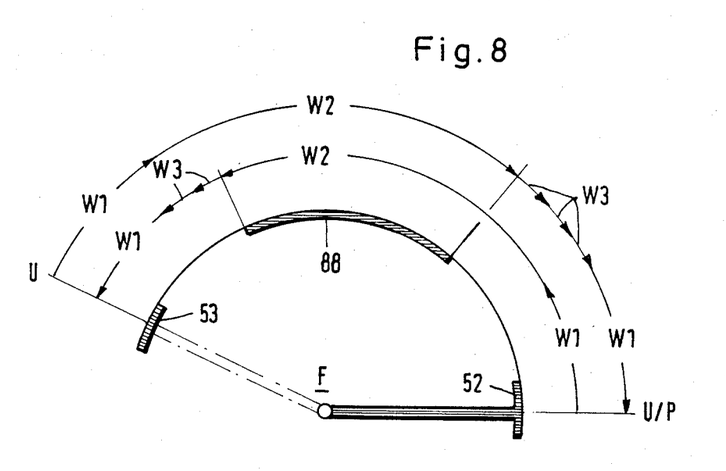

FIG. 8 shows a combination of various embodiments which have been already described. In the angular range W1 the series resistor is connected when the motor starts. The series resistor is again bridged by a timing element. In the angular range W2 the motor runs at its nominal speed. Within the variable angular range W3 the series resistor is connected again, so that the effective angular range W1 with a reduction of the rotational speed is again dependent on the wiping speed and/or on the operating voltage as has been illustrated with regard to FIG. 7. In the reversing positions or in the parking position the motor is braked by short circuit, i.e., the series resistor is located between the voltage source and the reserving switch according to FIG. 2.

Figure 9:
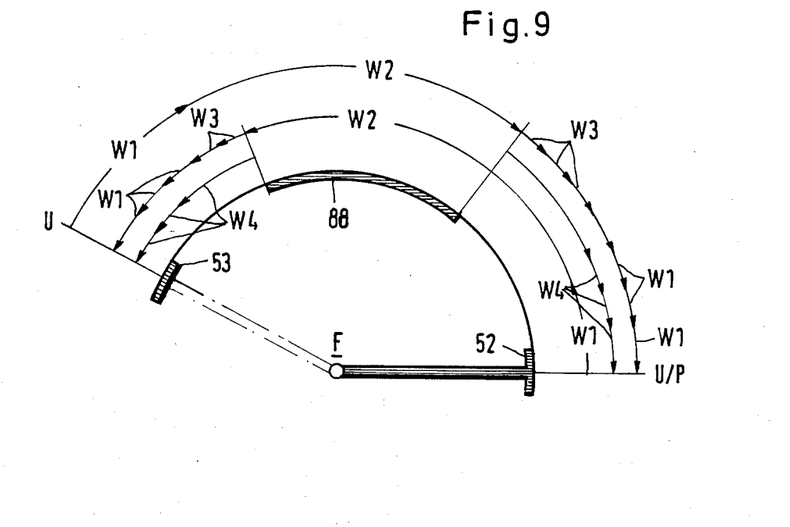

FIG. 9 illustrates an embodiment which corresponds to that of FIG. 8, however in which in accordance with U.S. Pat. No. 4,392,631 the switching-off time is changed additionally, i.e., the disconnection of the relays 20 or 21 in dependence on the wiping speed or the operating voltage. Therefore a variable angular range W4 is defined which follows the angular range W2 and the motor is switched off at the end of this angular range W4.

Figure 10:
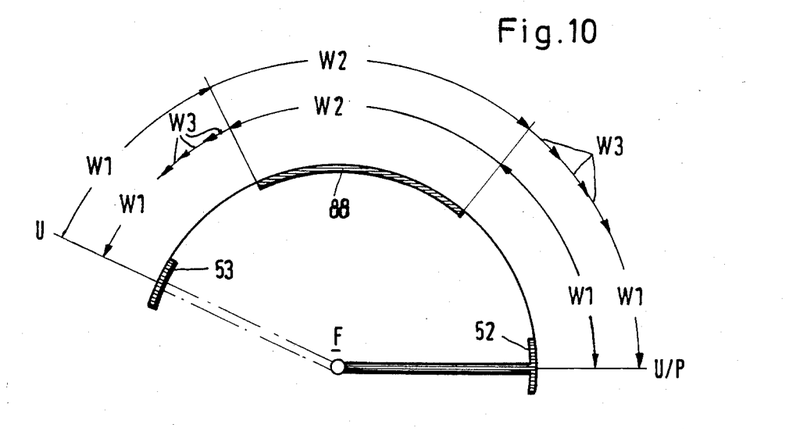

FIG. 10 belongs to the embodiment according to FIG. 3, in which the rotational speed is continuously increased up to a maximum value in the angular range W1. In the angular range W2 the actual rotational speed is determined and in dependence thereon is determined the angular range W1, in which the rotational speed is continuously reduced. An embodiment could also be conceived in which, in dependence on the time, which is necessary for running through the angular range W2, is varied the rate of speed regulation per time unit, but the angular range W2 continues to be directly defined by a position switch.

Embodiments are of course conceivable in which in dependence on the wiping speed or rotational speed of the motor actually measured in an embodiment according to FIG. 2 only one or both series resistors are inserted in the motor circuit. Furthermore FIGS. 1 and 2 may be combined by inserting series resistors in the circuit between the voltage source and the reversing switch and in the circuit between the reversing switch and the motor.

Figure 11:
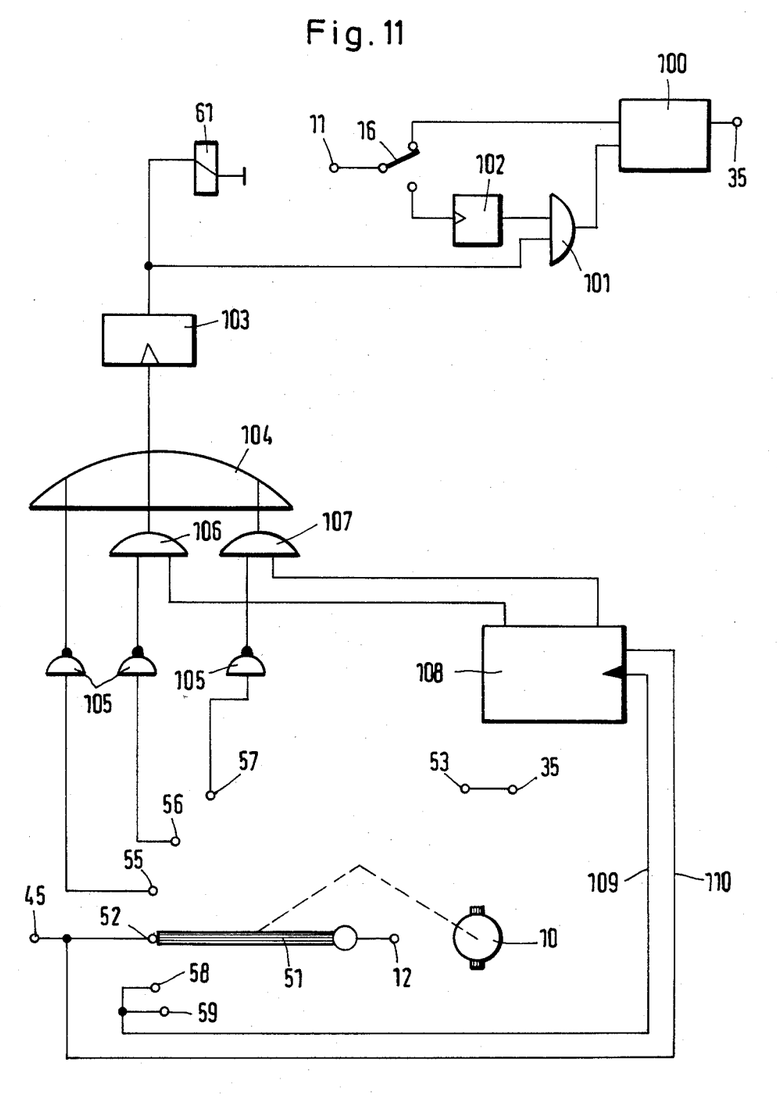
FIG. 11 is a circuit diagram illustrating further advantageous embodiments.

FIG. 11 shows part of a circuit arrangement as a block diagram by means of which further advantageous embodiments will be described. A memory 100, is set in the operating position of the single switch 16 shown in the drawing and thereby is connected positive potential to the input 35 of the timing element 30. In the off-position of single switch 16 a gate 101 is opened via a pulse generator 102, to which gate is conducted the control signal for the relay 61. This control signal is tapped off from a timing element 103 which is triggered by an OR-gate 104. Signals are conducted to the OR-gate 104 via the inverter 105 and two AND-gates 106 and 107, when the bridging contact 51 of the switch 50 is actuated by the motor and springs on corresponding stationary contacts 55, 56 and 57. The AND-gates 106 and 107 are controlled by output signals of a memory 108 which, for example, includes a counter to which clock pulses are conducted via a lead 109. The clock pulses are released, when the bridging contact 51 of the switch 50 springs on the stationary contacts 58 or 59. The contacts 52 and 53 can also be acted upon by the bridging contact 51. These contacts are connected with the inputs 35 or 45 of the timing elements 30 or 40 in the embodiment according to FIG. 1.

To describe the functioning of this circuit arrangement it is assumed that the single switch 15 is switched on and the wiper motor has run through one wiping cycle. Initially no signal may be measured at the outputs of the memory 108. The timing element 103 is set and thus the relay 61 is energised, because the bridging contact 51 has already moved across the stationary contact 55. Consequently the motor is operated at reduced rotational speed. As soon as the bridging contact jumps on the stationary contact 52 a brake circuit for the motor is closed as has been described. The motor 10 and thus the bridging contact after-run in counter clockwise direction for a predetermined angular range. If the stationary contact is not reached the course of operation is not changed and in the following wiping cycle only the switching signal released through the stationary contact 55 is used for controlling the switching member or the relay 61. If however, the bridging contact 51 reaches the stationary contact 58, when the window pane is wet, the memory 108 is set in such a way that the AND-gate 106 is controlled. Consequently during the next wiping cycle the relay 61 is energised as soon as the bridging contact 51 springs on the stationary contact 56. The motor 10 is therefore reduced to a lower rotational speed earlier in the wiping cycle, so that it is stopped within the predetermined angular range in the reversing position. If the bridging contact is adjusted as far as the stationary contact 59 when the operating voltage is high and the window pane is wet, two pulses are released and the AND-gate 107 is also controlled. Thus the rotational speed of the motor is reduced even earlier. In the circuit arrangement according to FIG. 11, the after-running angle after switching off of the motor in the parking position is compared with a desired parking position. From this comparison a correction value is derived which is stored in a memory. This correction value determines the angular position in which, during the following cycle, the rotational speed of the motor is reduced. Thus, the angular range is automatically determined in which the rotational speed is to be reduced. Tolerances of the various wiper systems with regard to motor output, frictional conditions on the window pane etc. are automatically balanced in this manner. This idea can also be realised in a system according to the principle of U.S. Pat. No. 4,392,631, i.e., the switching-off time is also varied in dependence on the value written into the memory.

This stored value may alternatively be continuously corrected. For this purpose a reset line 110 is provided through which the memory 108 is reset after every cycle, so that then a new value can be written which, during the following cycle, determines the angular wiper range for reducing the rotational speed or the switching-off time.

In the circuit arrangement according to FIG. 11 the switching signal released in the off-position of the single switch 16, which switching signal serves to switch off the system or to reset the memory 100, can only become effective if relay 61 has been priorly energised. Thus the gate 101 is controlled. In this manner it is ensured that the memory 100 is only reset when the relay 61 has been priorly energised and therefore when the rotational speed has been reduced. Of course this layout is only necessary if the system provides that the rotational speed is only reduced, when the wipers enter the parking position.

The position switches or limit switches of the embodiments shown in the drawings are realised by contacts. However embodiments comprising known optic coding disks or other sensors can also be used. The after-running angle and thus the correction value can be determined by measuring the time the wiper needs to run out.

Thus a smooth starting and slowing down of the wiper and an accurate parking position can be achieved by a reduction of the rotational speed in given angular ranges. In order to solve this problem the braking circuit of the motor can also be affected. In the embodiment according to FIG. 1 a high resistance can be connected into the motor circuit and then the resistance value can be reduced, as soon as both relays have been de-energised. Moreover, a voltage pulse of reverse polarity could be conducted to the motor. This results in further combinations which can be realised relatively easily.

Finally it is pointed out that the storing of the correction value or the control through differing resistance networks can also be advantageously used for different modes of operation when it is not deemed to be necessary that the wiper starts and slows down smoothly, especially in smaller rear-window wiper systems. Of course one of the resistors of this resistance network can, moreover, be variable so that the interval time between two wiping cycles or the wiper frequency can be continuously modified. The basic ideas of the invention can in particular be advantageously used, when two motors are to be energised synchronously because, due to a strict adherence to the reversing positions it is ensured that two wipers operated by these motors do not collide in a common wiping area.

What is claimed is:

1. In a circuit arrangement for a reversible electric motor for directly driving an element in pendulum-fashion between two reversing positions, especially a windshield wiper on motor vehicles, and wherein the polarity of the supply voltage for the motor is reversed in the reversing positions via a reversing switch or is switched off in a parking position, the improvement comprising:
a switching stage for controlling energization of said motor such that the rotational speed of said motor is reduced in predetermined angular ranges, said motor is operated at reduced rotational speed in defined angular ranges before each reversing position and the size of said angular range before said parking position or said reversing position is variable in dependence on certain measured parameters.

2. A circuit arrangement in accordance with claim 1, wherein:
said electric motor is operated at reduced rotational speed in a defined angular range before reaching a parking position.

3. A circuit arrangement in accordance with claim 2, wherein:
said motor is operated at reduced rotational speed in defined angular ranges before each reversing position.

4. A circuit arrangement in accordance with claim 2, wherein:
said motor is operated at reduced rotational speed in a defined angular range after leaving a parking position or a reversing position.

5. A circuit arrangement in accordance with claim 3, wherein:
said motor is operated at reduced rotational speed in a defined angular range after leaving a parking position or a reversing position.

6. A circuit arrangement in accordance with claim 5, wherein:
said switching stage includes a plurality of series resistors and each of said series resistors is arranged parallel to a switching path of a controllable switching element and that, in said defined angular ranges said switching path is open, but closed otherwise.

7. A circuit arrangement in accordance with claim 6, wherein:
said switching stage includes a plurality of position switches and said switching element is controlled by switching signals which are directly or indirectly released by said position switches which are actuated by said motor in predetermined angular positions.

8. A circuit arrangement in accordance with claim 7, wherein:
said switching stage includes means for generating a switching-off signal to stop said motor through an operating switch and after switching-off of said operating switch, said motor is stopped in said parking position, said switching-off signal of said operating switch only being effective when said switching element is previously controlled such that the rotational speed of said motor is reduced.

9. A circuit arrangement in accordance with claim 1, wherein:
said motor is operated at reduced rotational speed in a defined angular range after leaving a parking position or a reversing position.

10. A circuit arrangement in accordance with claim 1, wherein:
said motor is operated at reduced rotational speed in a defined angular range after leaving a parking position or a reversing position.

11. A circuit arrangement in accordance with claim 1, wherein:
said parameters are the motor supply voltage and the rotational speed of said motor.

12. A circuit arrangement in accordance with claim 1, wherein:
in said predetermined angular ranges, the rotational speed of said motor is variable by several steps or continuously.

13. A circuit arrangement in accordance with claim 12, wherein:
said switching stage varies the supply voltage for the motor or the pulse width of the voltage pulses conducted to the motor.

14. A circuit arrangement in accordance with claim 12, wherein:
said switching stage connects different series resistors into the motor circuit to vary the rotational speed of said motor.

15. A circuit arrangement in accordance with claim 14, wherein:
at least one of said series resistors may be connected into the circuit between a reversing switch and a motor terminal.

16. A circuit arrangement in accordance with claim 15, wherein:
said reversing switch has two change-over bridging contacts connected with said motor of which each may be operated by a switching relay and of which each co-operates with two stationary contacts connected with said voltage source, and that, in the reversing positions, said relays are successively controlled with a time delay via limit switches which may be actuated by said motor.

17. A circuit arrangement in accordance with claim 14, wherein:
at least one of said series resistors may be connected into the circuit between a voltage source and said reversing switch.

18. A circuit arrangement in accordance with claim 17, wherein:
said reversing switch has two change-over bridging contacts connected with said motor of which each may be operated by a switching relay and of which each co-operates with two stationary contacts connected with said voltage source, and that, in the reversing positions, said relays are successively controlled with a time delay via limit switches which may be actuated by said motor.

19. A circuit arrangement in accordance with claim 1, wherein:
after switching-off of said motor the actual parking position of said element is determined and compared with a desired position, the angular difference between said parking position and said desired position is stored in a memory as a correction value;
and in dependence on said correction value at least one of the following steps occurs;
said motor is switched off at differing angular positions;
the angular range is changed with reduced rotational speed;
said motor is acted upon by a pulse of reverse polarity of differing pulse duration.

20. A circuit arrangement in accordance with claim 19, wherein:
said correction value is only determined when said motor is intially switched on.

21. A circuit arrangement in accordance with claim 20, wherein:
said correction value is determined in each cycle and evaluated in the following cycle.

22. A circuit arrangement, in accordance with claim 1 comprising:
timing elements;
circuit elements;
an arbitrarily actuable operating switch having a plurality of switching positions to selectively couple said circuit elements to said timing elements to determine the delay time of said timing elements, said timing elements being retardedly controlled one after the other via said reversing switch.

23. A circuit arrangement in accordance with claim 1, comprising:
a brake circuit connectable to said motor, the effect of said brake circuit being variable.

24. A circuit arrangement in accordance with claim 23, comprising:
at least one resistor inserted in the operating circuit, and the value of said resistor is variable.

* * * * *